United States Patent
Shinkaji et al.

(10) Patent No.: US 11,893,746 B2
(45) Date of Patent: Feb. 6, 2024

(54) IMAGE PROCESSOR, DISPLAY DEVICE HAVING THE SAME AND OPERATION METHOD OF DISPLAY DEVICE

(71) Applicant: SAMSUNG DISPLAY CO., LTD., Yongin-si (KR)

(72) Inventors: Yasuhiko Shinkaji, Yokohama (JP); Kazuhiro Matsumoto, Yokohama (JP); Masahiko Takiguchi, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 388 days.

(21) Appl. No.: 17/117,560

(22) Filed: Dec. 10, 2020

(65) Prior Publication Data
US 2021/0241459 A1 Aug. 5, 2021

(30) Foreign Application Priority Data
Feb. 4, 2020 (KR) .................. 10-2020-0013236

(51) Int. Cl.
*G06T 7/11* (2017.01)
*G06T 7/13* (2017.01)
(Continued)

(52) U.S. Cl.
CPC .................. *G06T 7/13* (2017.01); *G06T 1/20* (2013.01); *G06T 7/11* (2017.01); *G06V 10/44* (2022.01);
(Continued)

(58) Field of Classification Search
USPC ....................................... 382/173, 199, 224
See application file for complete search history.

(56) References Cited

U.S. PATENT DOCUMENTS 6,917,707 B1 * 7/2005 Kubota .................. G06T 7/136
358/463
10,643,396 B2 * 5/2020 Eastwood ............... G06T 7/194
(Continued)

FOREIGN PATENT DOCUMENTS

| KR | 10-1488343 | 1/2015 |
| KR | 10-1639949 | 7/2016 |
| KR | 10-2019-0021066 | 3/2019 |

OTHER PUBLICATIONS

P. Kulkarni, A. Khatri, P. Banga and K. Shah, "Automatic No. Plate Recognition (ANPR) system for Indian conditions," 2009 19th International Conference Radioelektronika, Bratislava, Slovakia, 2009, pp. 111-114, (Year: 2009).*

(Continued)

*Primary Examiner* — Ishrat I Sherali
(74) *Attorney, Agent, or Firm* — CHAU & ASSOCIATES, LLC

(57) ABSTRACT

The present disclosure describes an image processor of a display device. The image processing includes a pre-processor, a segmentation processor, and a correction processor. The pre-processor performs spatial filtering on an input image signal and output a line image signal. The segmentation processor classifies a class of the line image signal and outputting a segmentation signal representing the class. The correction processor corrects the segmentation signal based on the line image signal. Additionally, the correction processor detects a class boundary of the segmentation signal, detects an edge within an edge region of the line image signal corresponding to the class boundary, and corrects the segmentation signal based on the detected edge.

20 Claims, 12 Drawing Sheets

(51) Int. Cl.
- *G06T 1/20* (2006.01)
- *G06V 30/146* (2022.01)
- *G06V 10/44* (2022.01)
- *G06V 30/10* (2022.01)

(52) U.S. Cl.
CPC .. *G06V 30/147* (2022.01); *G06T 2207/20182* (2013.01); *G06V 30/10* (2022.01)

(56) References Cited

U.S. PATENT DOCUMENTS

| | | | |
|---|---|---|---|
| 11,475,816 B2 * | 10/2022 | Shinkaji | G09G 3/2092 |
| 2014/0320518 A1 * | 10/2014 | Morishita | G06T 5/00 345/589 |

OTHER PUBLICATIONS

S. Wachenfeld, H.U. Klein and Xiaoyi Jiang, "Recognition of Screen-Rendered Text," 18th International Conference on Pattern Recognition (ICPR'06), Hong Kong, China, 2006, pp. 1086-1089 (Year: 2006).*

Ronneberger, et al., "U-Net: Convolutional Networks for Biomedical Image Segmentation", Computer Science Department and BIOSS Centre for Biological Signalling Studies, University of Freiburg, Germany, arXiv:1505.04597v1 [cs.CV] May 18, 2015, 8 pages.

Zhao, et al., "ICNet for Real-Time Semantic Segmentation on High-Resolution Images", The Chinese University of Hong Kong, Tencent Youtu Lab, SenseTime Research, arXiv:1704.08545v2 [cs.CV] Aug. 20, 2018, 16 pages.

* cited by examiner

FIG. 7

| # | Filter Coefficient(9x1) | | | | | | | | |
|---|---|---|---|---|---|---|---|---|---|
| 0 | 0.025 | 0.05 | 0.10 | 0.20 | 0.25 | 0.20 | 0.10 | 0.05 | 0.025 |
| 1 | 0.00 | 0.05 | 0.10 | 0.15 | 0.40 | 0.15 | 0.10 | 0.05 | 0.00 |
| 2 | 0.00 | 0.00 | 0.10 | 0.15 | 0.50 | 0.15 | 0.10 | 0.00 | 0.00 |
| 3 | 0.00 | 0.00 | 0.00 | 0.20 | 0.60 | 0.20 | 0.00 | 0.00 | 0.00 |
| 4 | 0.00 | 0.00 | 0.00 | -0.25 | 1.50 | -0.25 | 0.00 | 0.00 | 0.00 |
| 5 | 0.00 | 0.00 | 0.00 | -0.50 | 2.00 | -0.50 | 0.00 | 0.00 | 0.00 |
| 6 | 0.00 | 0.00 | 0.00 | -1.00 | 3.00 | -1.00 | 0.00 | 0.00 | 0.00 |
| 7 | 0.00 | 0.00 | 0.00 | -2.00 | 5.00 | -2.00 | 0.00 | 0.00 | 0.00 |

Smooth ↑ ↓ Sharpen

IM41
Li

IM42
Sgci

IM43
Scci

IMAGE PROCESSOR, DISPLAY DEVICE HAVING THE SAME AND OPERATION METHOD OF DISPLAY DEVICE

This application claims priority to Korean Patent Application No. 10-2020-0013236, filed on Feb. 4, 2020, and all the benefits accruing therefrom under 35 U.S.C. § 119, the contents of which are hereby incorporated by reference in their entirety.

BACKGROUND

Field of Disclosure

The present disclosure herein relates to a display device, and more specifically, to a display device including an image processor.

Description of the Related Art

Display devices show images to a user using light sources such as light-emitting diodes (LEDs). Display devices may be used in televisions, smartphones, and computers. An organic light-emitting display (OLED) device is a type of display device. A display device may include a driving circuit for driving a display panel. The display panel itself may include a plurality of scan lines, a plurality of data lines, and a plurality of pixels.

In some cases, a display device may display may perform image segmentation to improve the display. For example, the device may detect alpha-numeric characters, and optimize the display for showing these characters. However, in some cases the image segmentation does not accurately detect which pixels correspond to a character (or other detected class). Therefore, there is a need in the art for systems and methods to improve image segmentation in a display device.

SUMMARY

The present disclosure also provides an operation method of a display device, the method capable of improving display quality.

An embodiment of the present disclosure provides an image processor including a pre-processor for performing spatial filtering on an input image signal and output a line image signal, a segmentation processor for classifying a class of the line image signal and outputting a segmentation signal representing the class, a correction processor for correcting the segmentation signal based on the line image signal, wherein the correction processor detects a class boundary of the segmentation signal, detects an edge within an edge region of the line image signal corresponding to the class boundary, and corrects the segmentation signal based on the detected edge.

In an embodiment, the segmentation processor may output the segmentation signal representing a first class when the line image signal represents a background and representing a second class when the line image signal represents a character. In an embodiment, the first class may correspond to a first grayscale and the second class may correspond to a second grayscale different from the first grayscale, and the class boundary may represent a position to which the first class and the second class of the segmentation signal are adjacent. In an embodiment, the line image signal may include line image signals respectively corresponding to lines, and the line image signals may include pixel image signals.

In an embodiment, the correction processor may calculate a threshold grayscale of the line image signal and detect, as the edge of the line image signal, the position of a pixel image signal which is adjacent to a pixel image signal of a different grayscale from the threshold grayscale among the pixel image signals within the edge region of the line image signal corresponding to the class boundary and has the same grayscale as the threshold grayscale. In an embodiment, the correction processor may not correct the segmentation signal when the edge is not detected in the edge region of the line image signal corresponding to the class boundary.

In an embodiment, the edge region of the line image signal corresponding to the class boundary may include ±K number of pixel image signals (K is a natural number) adjacent to the class boundary, and the correction processor may output a corrected segment signal corrected for the class boundary based on the edge of the line image signal. In an embodiment, the segmentation processor may further output a class reliability signal representing the reliability of the first class and the second class, and the correction processor may change the segmentation signal of the second class which has low reliability to the segmentation signal of the first class in response to the class reliability signal.

In an embodiment of the present disclosure, a display device includes a display panel including a plurality of pixels connected to a plurality of data lines and a plurality of scan lines, respectively, a data driving circuit for driving the plurality of data lines, a driving controller for receiving a scan driving circuit which drives the plurality of scan lines, a control signal and an image signal and controlling the data driving circuit and the scan driving circuit such that an image is displayed on the display panel.

In an embodiment, the driving controller may include a pre-processor configured to perform spatial filtering on an input image signal and output a line image signal, a segmentation processor configured to classify a class of the line image signal and output a segmentation signal representing the class, a correction processor configured to output a corrected segmentation signal corrected for the segmentation signal based on the line image signal, and a data signal output part configured to receive the line image signal and the corrected segmentation signal and provide a data signal to the data driving circuit. In an embodiment, the correction processor may detect a class boundary of the segmentation signal, detect an edge within an edge region of the line image signal corresponding to the class boundary, and correct the segmentation signal based on the detected edge.

In an embodiment, the segmentation processor may output the segmentation signal representing a first class when the line image signal represents a background and representing a second class when the line image signal represents a character. In an embodiment, the first class may correspond to a first grayscale and the second class may correspond to a second grayscale different from the first grayscale, and the class boundary may represent a position to which the first class and the second class of the segmentation signal are adjacent.

In an embodiment, the line image signals may include pixel image signals. In an embodiment, the correction processor may calculate a threshold grayscale of the line image signal and detect, as the edge of the line image signal, the position of a pixel image signal which is adjacent to a pixel image signal of a different grayscale from the threshold grayscale among the pixel image signals within the edge region of the line image signal corresponding to the class boundary and has the same grayscale as the threshold grayscale. In an embodiment, the segmentation processor may further output a class reliability signal representing the reliability of the first class and the second class, and the correction processor may change the segmentation signal of the second class which has low reliability to the segmentation signal of the first class in response to the class reliability signal.

In an embodiment of the inventive concept, an operation method of a display device includes performing spatial filtering on an input image signal and outputting a line image signal, classifying a class of the line image signal and outputting a segmentation signal representing the class, detecting a class boundary of the segmentation signal, detecting an edge within an edge region of the line image signal corresponding to the class boundary, and correcting the segmentation signal based on the detected edge. In an embodiment, the outputting of a segmentation signal may include outputting the segmentation signal representing a first class when the line image signal represents a background and representing a second class when the line image signal represents a character, and the class boundary of the segmentation signal may be a position to which the first class and the second class are adjacent.

In an embodiment, the line image signal may include line image signals respectively corresponding to lines, and the line image signals may include pixel image signals. In an embodiment, the detecting of an edge may include calculating a threshold grayscale of the line image signal and detecting, as the edge of the line image signal, the position of a pixel image signal which is adjacent to a pixel image signal of a different grayscale from the threshold grayscale among the pixel image signals within the edge region of the line image signal corresponding to the class boundary and has the same grayscale as the threshold grayscale.

In an embodiment, the correcting of the segmentation signal based on the detected edge may not correct the segmentation signal when the edge is not detected in the edge region of the line image signal corresponding to the class boundary. In an embodiment, the edge region of the line image signal corresponding to the class boundary may include ±K number of pixel image signals (K is a natural number) adjacent to the class boundary. In an embodiment, the outputting of a segmentation signal may further output a class reliability signal representing the reliability of the first class and the second class.

In an embodiment, the method may further include outputting a corrected segmentation signal in which the segmentation signal of the second class which has low reliability is changed to the segmentation signal of the first class in response to the class reliability signal. In an embodiment, the detecting of a class boundary of the segmentation signal may include detecting the class boundary of the corrected segmentation signal.

An embodiment of the present disclosure provides a method of image processing including performing semantic segmentation on an image signal to produce an image segmentation signal; performing edge detection on the image signal; correcting the image segmentation signal based on the edge detection to produce a corrected image segmentation signal; and displaying an image based on the corrected image segmentation signal.

BRIEF DESCRIPTION OF THE FIGURES

The present disclosure provides an image processor of a display device. The accompanying drawings are included to provide a further understanding of the present disclosure and are incorporated in and constitute a part of this specification. The drawings illustrate exemplary embodiments of the present disclosure and, together with the description, serve to explain principles of the present disclosure. In the drawings:

FIG. 7 shows an example of filter coefficients stored in the memory illustrated in FIG. 6;

DETAILED DESCRIPTION

Figure 1:
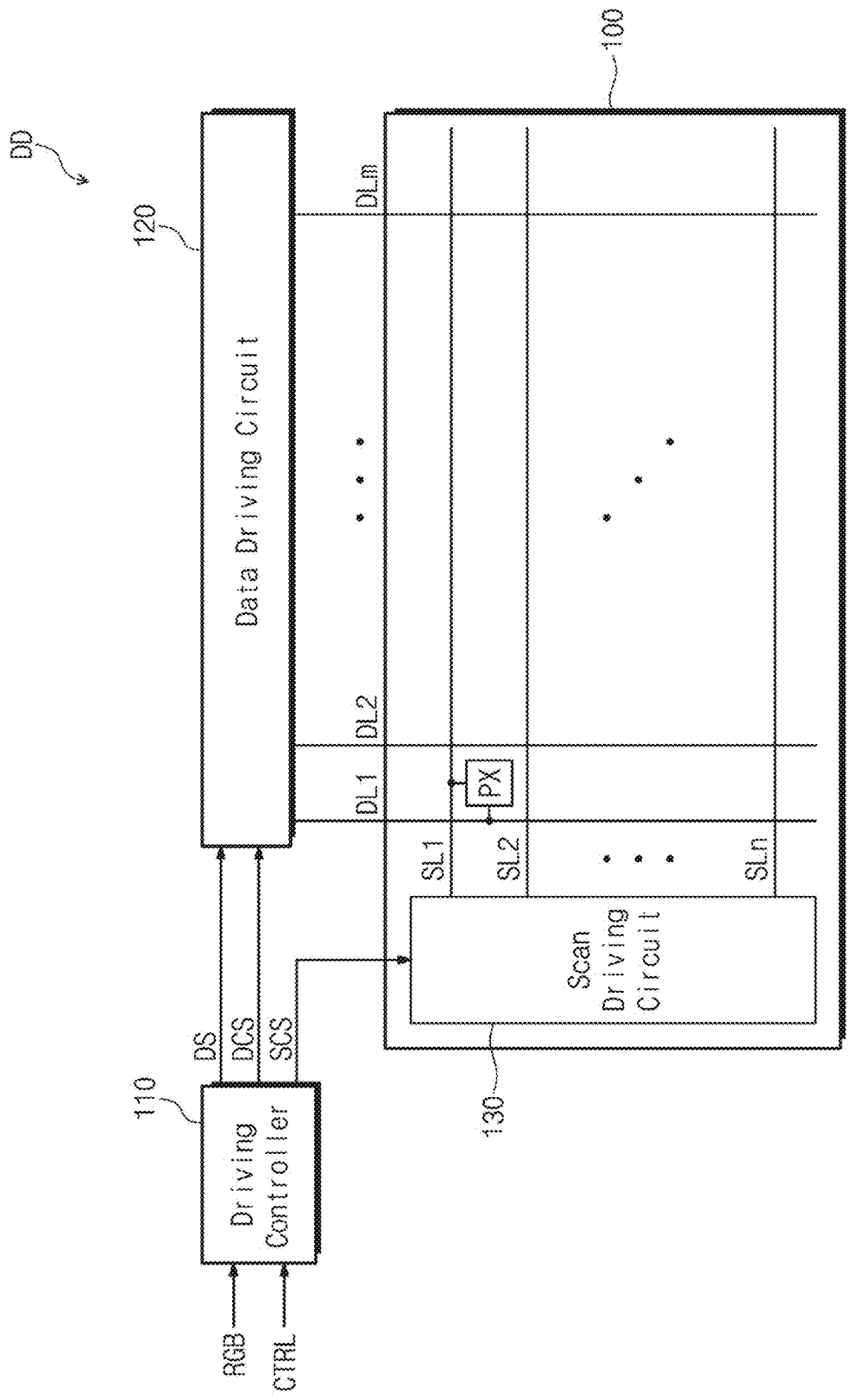
FIG. 1 shows an example of a display device according to an embodiment of the present disclosure.

The present disclosure relates generally to a display device, and more particularly, a display device that perform image segmentation. Embodiments of the present disclosure correct an image segmentation signal of the display device based on an edge detection.

In some cases, a display device may perform image segmentation (e.g., to detect the presence of alpha-numeric characters). However, when the segmentation is inaccurate, it may cause problems in the display of the characters. Therefore, embodiments of the present disclosure may perform edge detection to correct deficiencies of the image segmentation.

A display device using edge detection to correct an image segmentation process may improve the display quality of an image. According to some embodiments, the display quality of the image may be further improved by correcting the image segmentation to reflect a class reliability of the segmentation. Edge mis-detection may also be reduced in regions having low reliability by performing a pre-processing operation (e.g., spatial filtering) on an input image signal.

According to some embodiments, an image processor includes a pre-processor, a segmentation processor, and a correction processor. The pre-processor performs spatial filtering on an input image signal and output a line image signal. The segmentation processor classifies a class of the line image signal and outputting a segmentation signal representing the class. The correction processor corrects the segmentation signal based on the line image signal. Additionally, the correction processor detects a class boundary of the segmentation signal, detects an edge within an edge region of the line image signal corresponding to the class boundary, and corrects the segmentation signal based on the detected edge.

Embodiments of the present disclosure provide a driving circuit that includes a data driving circuit. The data driving circuit is used to output a data driving signal to data lines, a scan driving circuit for outputting a scan signal for driving scan lines, and a driving controller for controlling the data driving circuit and the scan driving circuit. The display device displays an image by outputting a scan signal through a scan line. A scan line is connected to each pixel of the display, where data voltage corresponding to a display image to a data line is connected to the pixel.

Additional embodiments of the present disclosure include a memory, a position calculator, a reliability calculator, a filter, and an operator and may output a line image signal in which brightness properties of a region with high reliability and brightness properties of a region with low reliability may be changed in the image signal.

Moreover, embodiments of the present disclosure perform spatial filtering on an input image signal and outputting a line image signal, classify a class of the line image signal and outputting a segmentation signal representing the class, detect a class boundary of the segmentation signal, detect an edge within an edge region of the line image signal corresponding to the class boundary, and correct the segmentation signal on the basis of the detected edge.

Additional embodiment of the present disclosure provide a process of performing spatial filtering on an input image signal and outputting a line image signal, correcting a character with low reliability of the segmentation signal as a background based on the class reliability signal, calculating the threshold grayscale of the a line image signal included in the line image signal, detecting a class boundary of the line segmentation signal corresponding to the line image signal of the segmentation signal, setting an edge region of the line image Li corresponding to the class boundary, and comparing the line image signal and the threshold gray level in the edge region EA and searches to detect the edge. The class boundary of the line segmentation signal is changed to a corrected class boundary of a position corresponding to the edge of the line image signal Li if the edge is detected in the edge region. A correction operation for the line segmentation signal is terminated without correcting the line segmentation signal if the edge is not detected in the edge region.

In the present disclosure, when an element (or a region, a layer, a portion, and the like) is referred to as being "on," "connected to," or "coupled to" another element, the element may be directly disposed on/connected to/coupled to the other element, or that a third element may be disposed therebetween.

Like reference numerals refer to like elements. Represented in the drawings, the thickness, the ratio, and the dimensions of elements are exaggerated for an effective description of technical contents. The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed as a second element, and, similarly, a second element could be termed as a first element, without departing from the scope of example embodiments of the present disclosure.

The terms of a singular form may include plural forms unless the context clearly indicates otherwise.

Additionally or alternatively, terms such as "below," "lower," "above," "upper," and the like are used to describe the relationship of the configurations shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure pertains. It is also to be understood that terms defined in commonly used dictionaries should be interpreted with meanings consistent with the meanings in the context of the related art, and are expressly defined herein unless the terms are interpreted in an ideal or overly formal sense.

Hereinafter, exemplary embodiments of the present disclosure will be described with reference to the accompanying drawings.

FIG. 1 shows an example of a display device according to an embodiment of the present disclosure.

Referring to FIG. 1, a display device DD includes a display panel 100, a driving controller 110, and a data driving circuit 120.

The display panel 100 includes a plurality of pixels PX, a plurality of data lines DL1-DLm, and a plurality of scan lines SL1-SLn. Each of the plurality of pixels PX is connected to a corresponding data line among the plurality of data lines DL1-DLm and connected to a corresponding scan line among the plurality of scan lines SL1-SLn.

The display panel 100 is a panel which displays an image and may be any one of a liquid crystal display (LCD) panel, an electrophoretic display panel, an organic light-emitting diode (OLED) panel, a light-emitting diode (LED) panel, an inorganic electroluminescent (EL) display panel, a field emission display (FED) panel, a surface-conduction electron-emitter display (SED) panel, a plasma display panel (PDP), and a cathode ray tube (CRT). Hereinafter, as a display device, according to an embodiment of the present disclosure, a liquid crystal display device will be exemplarily described, and the display panel 100 will also be described as being a liquid crystal display panel. However, the display device DD and the display panel 100 of the present disclosure are not limited thereto. Various types of display devices and display panels may be used.

The driving controller 110 receives an input image signal RGB from the outside and a control signal CTRL for controlling the display thereof. For example, the control signal CTRL may include at least one synchronization signal and at least one clock signal. The driving controller 110 provides the data driving circuit 120 with a data signal DS in which the input image signal RGB is processed to meet operation conditions of the display panel 100. The driving controller 110 provides the data driving circuit 120 with a first control signal DCS and provides a scan driving circuit 130 with a second control signal SCS based on the control signal CTRL. The first control signal DCS may include a horizontal synchronization start signal, a clock signal, and a line latch signal, and the second control signal SCS may include a vertical synchronization start signal and an output enable signal.

The data driving circuit 120 may output grayscale voltages for driving the plurality of the data lines DL1-DLm in response to the first control signal DSC and the data signal DC from the driving controller 110. According to an embodiment, the data driving circuit 120 may be implemented as an integrated circuit (IC) and mounted directly on a predetermined region of the display panel 100, or mounted on a separate printed circuit board in a chip on film (COF) manner to be electrically connected to the display panel 100. In another embodiment, the data driving circuit 120 may be formed on the display panel 100 by the same process as the process for forming a driving circuit of the pixels PX.

The scan driving circuit 130 drives the plurality of scan lines SL1-SLn in response to the second control signal SCS from the driving controller 110. In an exemplary embodiment, the scan driving circuit 130 may be formed on the display panel 100 by the same process as the process for forming a driving circuit of the pixels PX, but the embodiment of the present disclosure is not limited thereto. According to an embodiment, the scan driving circuit 130 may be implemented as an integrated circuit (IC) and mounted directly on a predetermined region of the display panel 100, or mounted on a separate printed circuit board in a chip on film (COF) manner to be electrically connected to the display panel 100.

Figure 2:
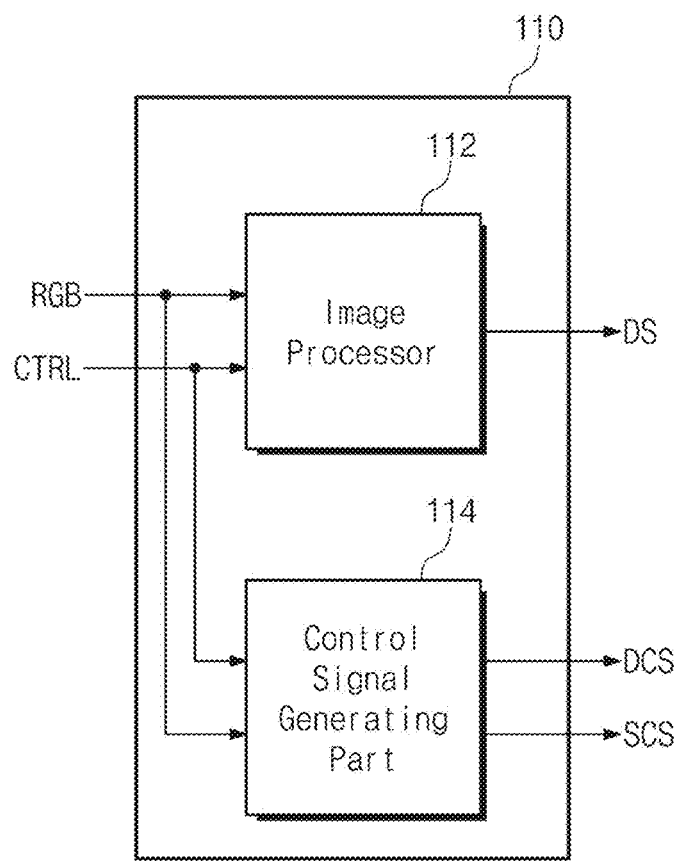
FIG. 2 is a block diagram of a driving controller according to an embodiment of the present disclosure.

FIG. 2 is a block diagram of a driving controller according to an embodiment of the present disclosure.

As illustrated in FIG. 2, the driving controller 110 includes an image processor 112 and a control signal generating part 114.

The image processor 112 outputs the data signal DS in response to the input image signal RGB and the control signal CTRL.

The control signal generating part 114 outputs the first control signal DSC and the second control signal SCS in response to the input image signal RGB and the control signal CTRL.

Figure 3:
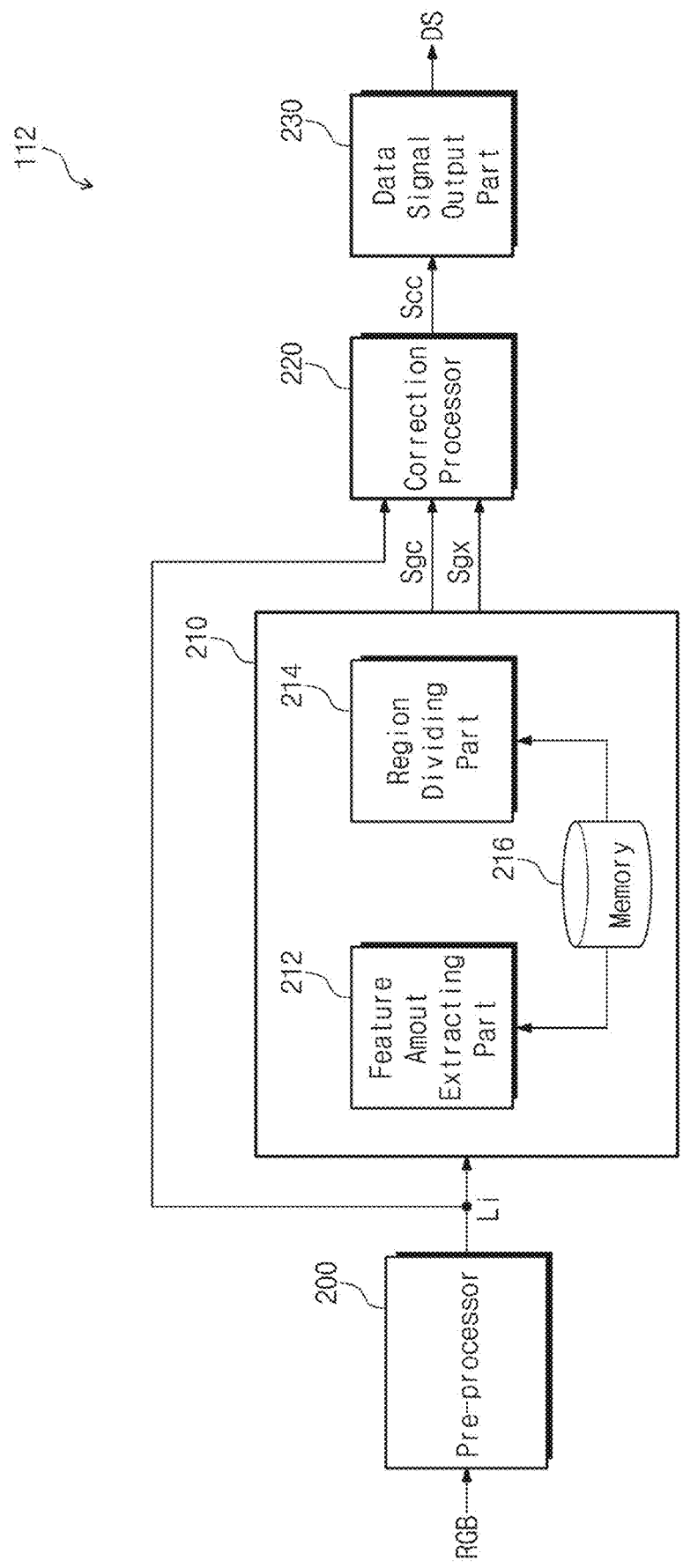
FIG. 3 is a block diagram of an image processor according to an embodiment of the present disclosure.

FIG. 3 is a block diagram of an image processor according to an embodiment of the present disclosure.

Referring to FIG. 3, the image processor 112 includes a pre-processor 200, a segmentation processor 210, the correction processor 220 and the data signal output part 230.

The pre-processor 200 performs spatial filtering for each line of a line image signal Li and output the line image signal Li. According to various examples, the line image signal Li may be an image signal which includes characters such as numbers, alphabet characters, or Korean characters, but the present disclosure is not limited thereto.

More generally, in digital image processing image segmentation (or semantic segmentation) is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

The segmentation processor 210 may be implemented using an artificial neural network (ANN), such as a Deep Neural Network (DNN). An ANN is a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

The segmentation processor 210 classifies a class of the line image signal Li and outputting a segmentation signal Sgc representing the class. The segmentation processor 210 includes a feature amount extracting part 212, a region dividing part 214, and a memory 216. The memory 216 may store pre-learned parameters for a neural network to perform the semantic segmentation.

The input image signal RGB may refer to an image signal of one frame which may be displayed on the display panel 100 (see FIG. 1). The input image signal RGB, which is an image signal of one frame, may include line image signals corresponding to lines (for example, the scan lines SL1-SLn, see FIG. 1). The line image signal Li may include pixel image signals corresponding to the pixels PX (see FIG. 1) connected to one scan line.

The feature amount extracting part 212 and the region dividing part 214 may use the parameters stored in the memory 216 to separate the line image signal Li into a background and a character. For example, each of the pixel image signals included in the line image signal Li may be identified as one of a background and a character.

The segmentation processor 210 may output the segmentation signal Sgc representing a first class when a pixel image signal in the line image signal Li is identified as a background. The segmentation processor 210 may output the segmentation signal Sgc representing a second class when a pixel image signal in the line image signal Li is identified as a character. The first class may correspond to a first grayscale and the second class may correspond to a second grayscale different from the first grayscale. In an exemplary embodiment, the first class may be set to 0 corresponding to a black grayscale and the second class may be set to 192 corresponding to a gray grayscale.

The correction processor 220 corrects the segmentation signal Sgc based on the line image signal Li. The correction processor 220 may output the corrected segmentation signal Scc.

The correction processor 220 detects a class boundary of the segmentation signal Sgc. For example, the correction processor 220 may detect an edge in an edge region of the line image signal Li corresponding to the detected class boundary. The correction processor 220 corrects the segmentation signal Sgc based on the detected edge and output the corrected segmentation signal Scc. The class boundary of the segmentation signal Sgc refers to a position to which a class value corresponding to a background and a class value corresponding to a character are adjacent.

Edge detection is a process for identifying discontinuities in a digital image (e.g., where the brightness changes suddenly). Points where the image brightness changes sharply may be organized into a set of curved line segments (i.e., edges). That is, an edge detector can take an image as input and output a set of points or curved line segments representing edges. In some cases, edge detection may be an intermediate step in a feature detection algorithm. Edge detection may be accomplished algorithmically (e.g., using the derivatives of Gaussian representation of an image), or using a machine learning model. For example, a neural network may be trained using annotated images, where the annotations represent known edges in an image.

The correction processor 220 may receive the line image signal Li in a line unit. A specific operation of the correction processor 220 will be described in detail later. The data signal output part 230 receives a corrected segmentation signal Scc and outputs the data signal DS suitable for the display panel 100 (see FIG. 1). The data signal DS may be provided to the data driving circuit 120 illustrated in FIG. 1.

Figure 4:
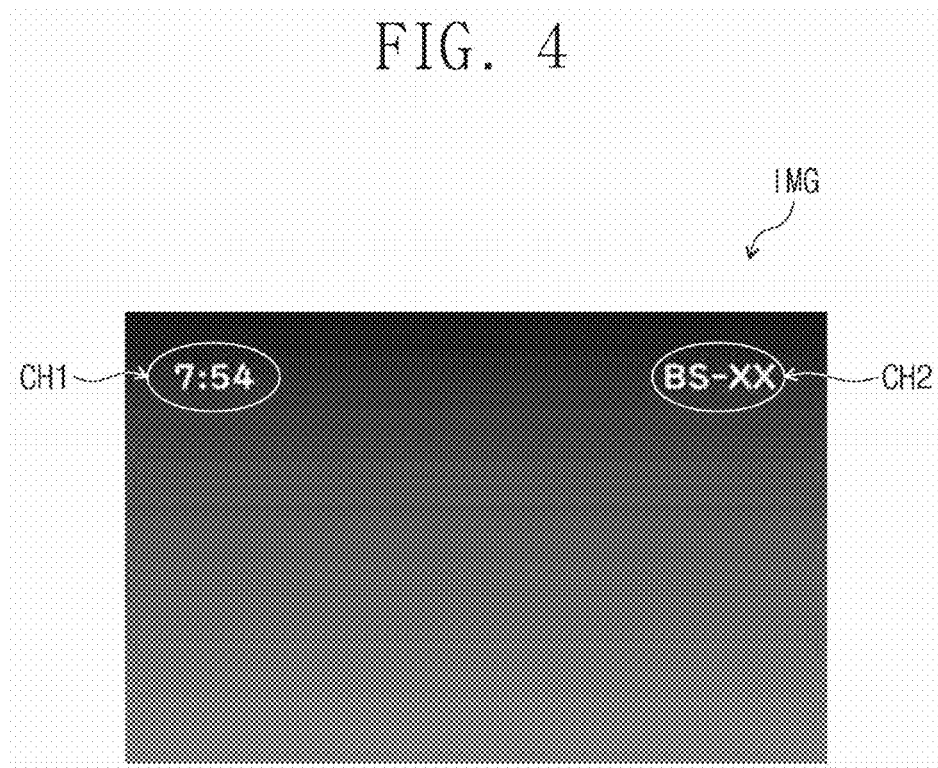
FIG. 4 shows an example of an image displayed on a display device.

FIG. 4 shows an example of an image displayed on a display device.

Referring to FIG. 4, an image IMG is one example of an image displayed on a display device such as a television, digital signage, and a kiosk. The image IMG may include a first character region CH1 for showing visual information and a second character region CH2 for showing a broadcast channel. In FIG. 4, the first character region CH1 may be positioned on the upper left end of the image IMG, and the second character region CH2 is positioned on the upper right end of the image IMG, but the embodiment of the present disclosure is not limited thereto. Also, the number of character regions displayed in the image IMG may be equal to one or higher. In an exemplary embodiment of the present disclosure, the display device DD may increase the display quality of a character displayed in the first character region CH1 and the second character region CH2.

Figure 5:
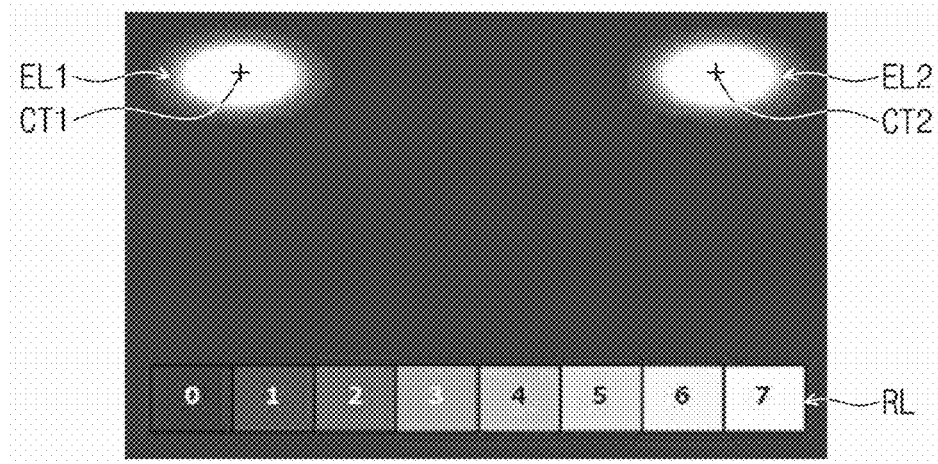
FIG. 5 shows an example of an elliptical region and a reliability level corresponding to a character region of an image.
Figure 6:
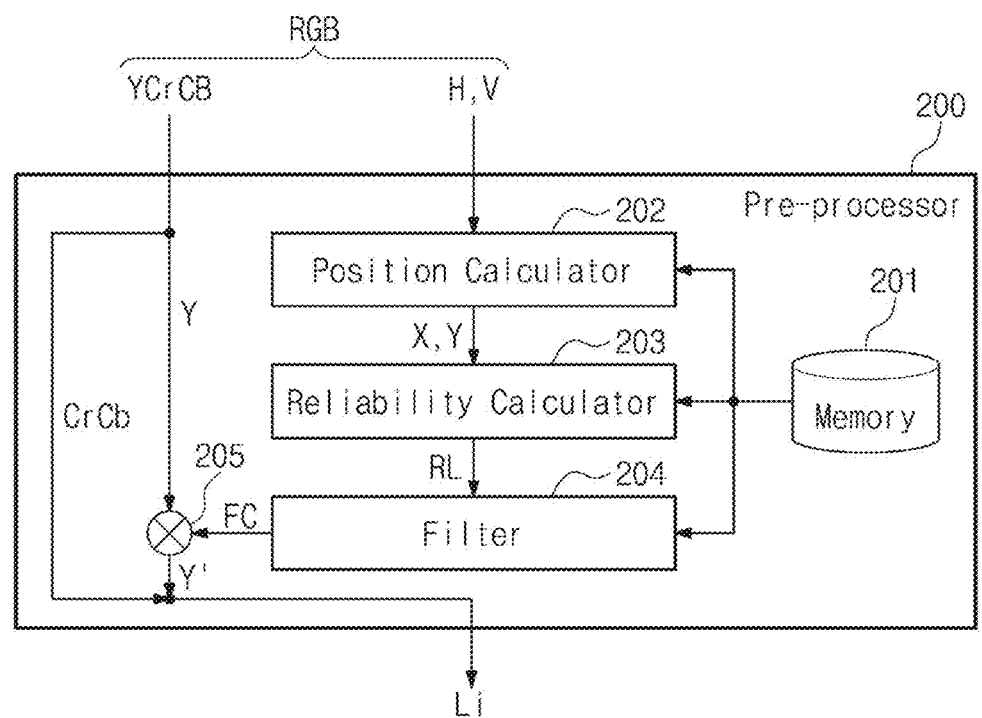
FIG. 6 is a block diagram of a pre-processor according to an embodiment of the present disclosure.

FIG. 5 shows an example of an elliptical region and a reliability level corresponding to a character region of an image. FIG. 6 is a block diagram of a pre-processor according to an embodiment of the present disclosure.

Referring to FIG. 4, FIG. 5, and FIG. 6, the pre-processor 200 includes a memory 201, a position calculator 202, a reliability calculator 203, a filter 204, and an operator 205. The input image signal RGB may include an image signal YCrCb including a brightness Y and colors Cr and Cb and position information H and V. The position information referred to as letters H and V include a horizontal position H and a vertical position V of the image signal YCrCb to be displayed on the display panel 100 (see FIG. 1).

The memory 201 stores information on a first elliptical region EL1 corresponding to the first character region CH1 and information on a second elliptical region EL2 corresponding to the second character region CH2. The information on the first elliptical region EL1 and the second elliptical region EL2 may include information about a center point CT1 of the first elliptical region EL1 and information about a center point CT2 of the second elliptical region EL2. The memory 201 stores a reliability component according to a position of the image signal YCrCb from the center point CT1 of the first elliptical region EL1 and the center point CT2 of the second elliptical region EL2. Furthermore, the memory 201 stores filter coefficients.

The position calculator 202 receives the position information H and V and calculates relative positions x and y between the position information H and V from the center point CT1 of the first elliptical region EL1 and the center point CT2 of the second elliptical region EL2. The relative positions x and y may be provided from the reliability calculator 203.

The reliability calculator 203 receives reliability from memory 201 and calculates the reliability component corresponding to the relative positions x and y. Reliability RL is provided to the filter 204.

The reliability scale illustrated in FIG. 5 visually shows reliability RL of eight levels from Level 0 to Level 7. Level 0 may correspond to a black grayscale and Level 7 may correspond to a white grayscale. For example, the center point CT1 of the first elliptical region EL1 and the center point CT2 of the second elliptical region EL2 has high reliability (Level 7), and regions except for the first elliptical region EL1 and the second elliptical region EL2 may have low reliability (Level 0). For example, reliability may refer to a probability that there may be a character present.

The filter 204 reads a filter coefficient FC corresponding to the reliability RL among the filter coefficients stored in the memory 201 and provides the filter coefficient FC to the operator 205.

The operator 205 calculates the brightness Y included in the input image signal RGB and the filter coefficient FC and outputs a corrected brightness Y'. As a result, the pre-processor 200 may output the line image signal Li added with the colors Cr and Cb and the corrected brightness Y'.

FIG. 7 shows an example of the filter coefficients stored in the memory 201 illustrated in FIG. 6.

Referring to FIG. 5, FIG. 6 and FIG. 7, the memory 201 may store filter coefficients corresponding to the reliability RL of 8 steps. The filter 204 may select a smooth filter coefficient for a region with a low level of reliability RL. For example, a region with a low probability that a character is to be displayed. The filter 204 may select a sharpen filter coefficient for a region with a high level of reliability RL. For example, a region with a high probability that a character is to be displayed. According to the filter 204 and the operator 205 described above, in a region in which the brightness Y is low. For example, a dark region, an image is smoothed, and in a region in which the brightness Y is high. For example, in a bright region, contrast may increase so an edge may be emphasized. As a result, the pre-processor 200 may output the line image signal Li in which the brightness Y properties of a region with high reliability and the brightness Y properties of a region with low reliability are changed in the image signal YCrCb.

Figure 8A:
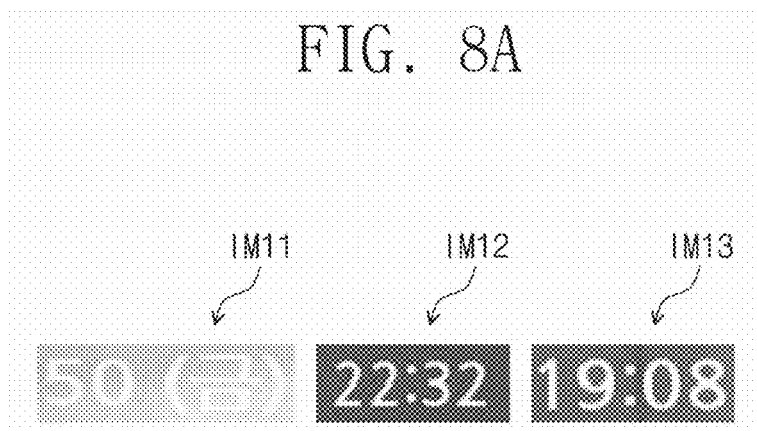
FIG. 8A to FIG. 8C are exemplary images for explaining the operation of the image processor shown in FIG. 3.
Figure 8B:
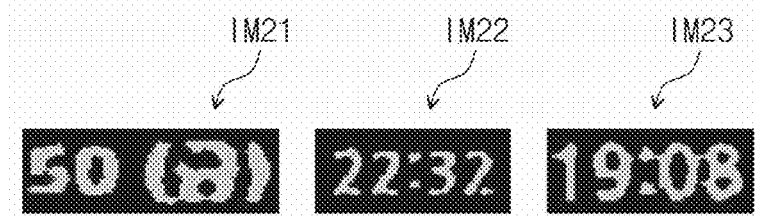
Figure 8C:
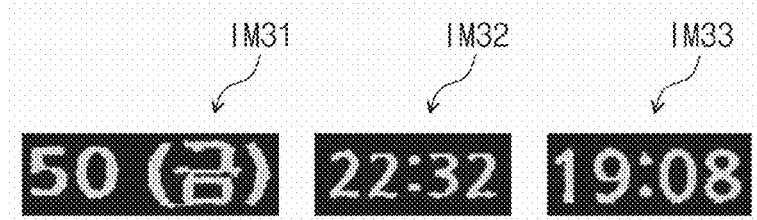

FIG. 8A to FIG. 8C are exemplary images for explaining the operation of the image processor 112 shown in FIG. 3.

FIG. 8A shows an example of input images IM11, IM12, and IM13. The input images IM11, IM12, and IM13 include characters such as numbers, Latin alphabet characters, Korean characters, or other written characters. The line image signal Li input to the image processor 112 illustrated in FIG. 3 may be correspond to input image IM11, IM12, or IM13.

FIG. 8B is a diagram showing the segmentation signal Sgc output from the segmentation processor 210 illustrated in FIG. 3 as an image. Segmentation images IM21, IM22, and IM23 are results of the segmentation processing of the input images IM11, IM12, and IM13 by the segmentation processor 210.

Referring to FIG. 8A and FIG. 8B, the segmentation processor 210 outputs the segmentation signal Sgc in which a background of the input images IM11, IM12, and IM13 is converted to a black grayscale and a character of the input images IM11, IM12, and IM13 is converted to a gray grayscale, so that the segmentation signal Sgc may correspond to the segmentation images IM21, IM22, and IM23.

Depending on the image processing performance of the segmentation processor 210, the segmentation images IM21, IM22, and IM23 may include a noise component at the boundary between the background and the character. In some cases, there may be a trade-off between the image processing speed and the accuracy of the segmentation processor 210. Therefore, the character recognition performance of the segmentation processor 210 may be lower when the image processing speed is higher.

FIG. 8C is a diagram showing the corrected segmentation signal Scc output from the correction processor 220 illustrated in FIG. 3 as an image. Corrected segmentation images IM21, IM22, and IM23 are results of the correction processing of the segmentation images IM21, IM22, and IM23 by the correction processor 220.

Referring to FIG. 8B and FIG. 8C, the correction processor 220 may remove the noise component at the boundary between the background and the character of the segmentation images IM21, IM22, and IM23 and output the corrected segmentation images IM21, IM22, and IM23. Therefore, the corrected segmentation images IM21, IM22, and IM23 may include characters in a form similar to that of characters included in the input images IM11, IM12, and IM13.

Figure 9:
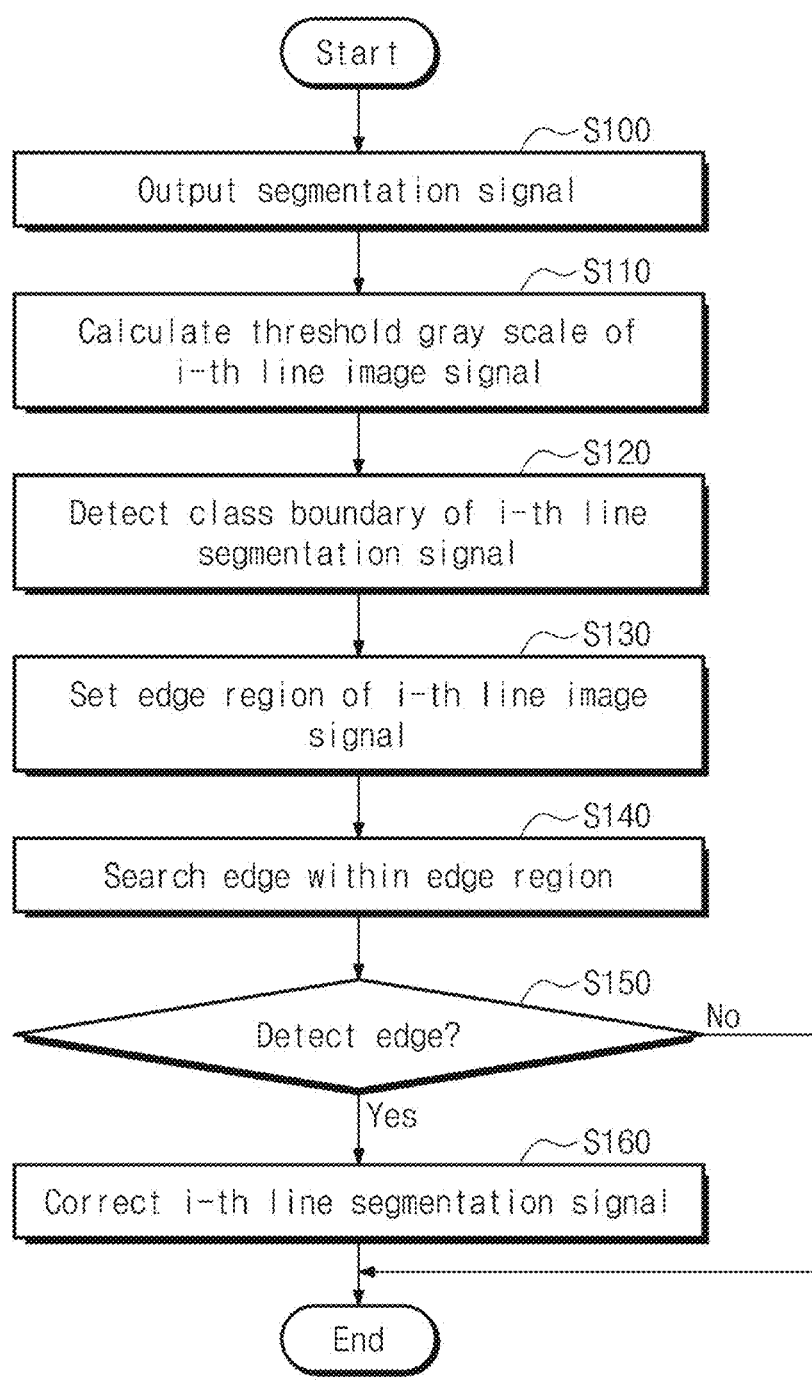
FIG. 9 is a diagram exemplarily showing the operation of an image processor according to an embodiment of the present disclosure.
Figure 10A:
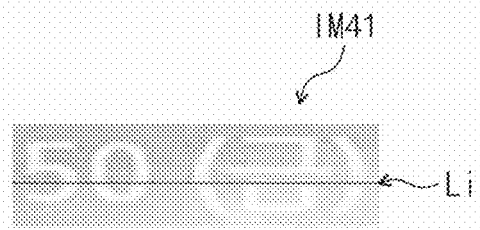
FIG. 10A to FIG. 10C are exemplary images for explaining the operation of an image processor.
Figure 10B:
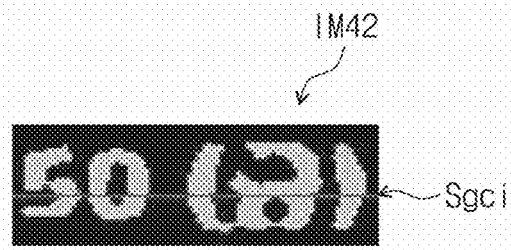
Figure 10C:
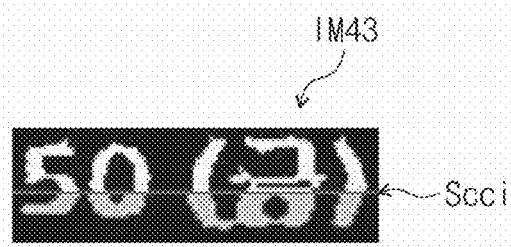
Figure 11:
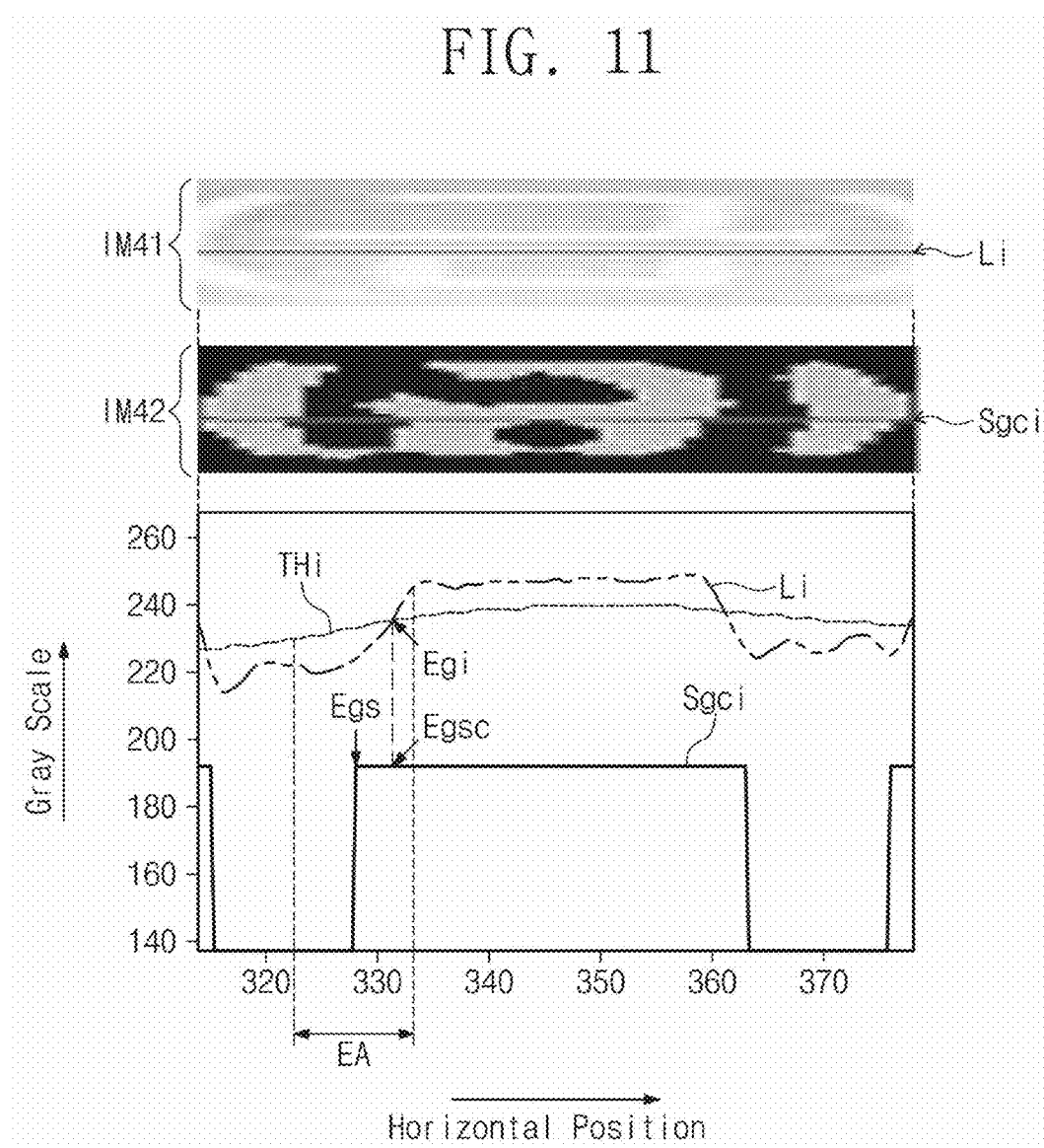
FIG. 11 is a diagram showing an example of signals used for the operation of an image processor.

FIG. 9 is a diagram showing an example of the operation of an image processor according to an embodiment of the present disclosure. FIG. 10A to FIG. 10C are exemplary images for explaining the operation of an image processor. FIG. 11 is a diagram showing an example of signals used for the operation of an image processor.

FIG. 11 shows an enlarged portion of an input image IM41 illustrated in FIG. 10A along with an enlarged portion of a segmentation image IM42 illustrated in FIG. 10B. Also, FIG. 11 shows an example of a threshold grayscale THi, a line image signal Li, a line segmentation signal Sgci, a class boundary Egs and an edge Egi corresponding to the input image IM41 and the segmentation image IM42. FIG. 11 is an exemplary diagram for explaining embodiments of the present disclosure, and the present disclosure is not limited to FIG. 11. In a graph of FIG. 11, the longitudinal direction represents a grayscale and the transverse direction represents horizontal directional positions of the pixels PX (see FIG. 1) corresponding to pixel image signals.

Referring to FIG. 3 and FIG. 9 to FIG. 11, the segmentation processor 210 classifies a class of the line image signal Li and outputs the segmentation signal Sgc representing the class (Step S100).

The line image signal Li may be an image signal for the input image IM41 illustrated in FIG. 10A. The input image IM41 may be an image of one frame to be displayed on the display panel 100 (see FIG. 1), or a partial image of one frame to be displayed on a portion of the display panel 100.

The segmentation signal Sgc output from the segmentation processor 210 may be displayed as the segmentation image IM42 illustrated in FIG. 10B. As described above, the segmentation processor 210 outputs the segmentation signal Sgc in which a background of the input image IM41 is converted to a black grayscale and a character of the input image IM41 is converted to a gray grayscale, so that the segmentation image IM42 includes the black grayscale and the gray grayscale.

The correction processor 220 calculates the threshold grayscale THi of the line image signal Li (Step S110).

The threshold grayscale THi is a signal in which the line image signal Li is smoothed. For example, the segmentation image IM42 of FIG. 10B includes a black grayscale region (i.e., the background) and a gray grayscale region (i.e., the foreground image, such as a character). Thus, the threshold grayscale THi may be a grayscale between the black grayscale representing a background and a gray grayscale representing a character. Therefore, the segmentation signal Sgc may be determined to be a character if the segmentation signal Sgc includes a grayscale higher than the threshold grayscale THi. Additionally or alternatively, the segmentation signal Sgc may be determined to be a background if the segmentation signal Sgc is a grayscale lower than the threshold gray level THi. In other words, the threshold gray level THi may be used as a criterion for determining whether the segmentation signal Sgc is a background or a character. In some examples, the threshold gray level THi may be a signal in which the brightness Y' component of the line image signal Li is smoothed.

The correction processor 220 detects the class boundary Egs of the line segmentation signal Sgci corresponding to the line image signal Li of the segmentation signal Sgc (S120).

The class boundary Egs may refer to edge of the line segmentation signal Sgci. For example, the class boundary Egs refers to the boundary between a background and a character of the line segmentation signal Sgci. In FIG. 11, the class boundary Egs of the line segmentation signal Sgci is a point at which the first class changes to the second class. For example, a black grayscale (0) may be changed to the second class such as a gray grayscale (192).

The correction processor 220 sets an edge region EA of the line image signal Li corresponding to the class boundary Egs (Step S130). The edge region EA may be set to include ±K number of pixel image signals (K is a natural number) based on the class boundary Egs. The correction processor 220 may set a number of pixel image signals as the edge region EA based on the class boundary Egs. For example, correction processor 220 may set ±20 number of pixel image signals.

The correction processor 220 compares the line image signal Li and the threshold gray level THi in the edge region EA and searches the edge Egi (Step S140).

An edge in the input image IM41 illustrated in FIG. 10A is a point of time at which a background is converted into a character. The correction processor 220 may determine a position at which the line image signal Li is changed to a grayscale (character) (Li≥THi) which is equal to or higher than the threshold gray level THi from a grayscale (background) (Li<THi) which is lower than the threshold gray level THi as the edge Egi.

When the edge Egi is detected in the edge region EA (Step S150), the correction processor 220 changes the class boundary Egs of the line segmentation signal Sgci to a corrected class boundary Egsc of a position corresponding to the edge Egi of the line image signal Li. In other words, the correction processor 220 performs a correction for changing the line segmentation signal Sgci between the class boundary Egs and the corrected class boundary Egsc to the first class (black grayscale (0)) representing a background (Step S160).

A correction operation for the line segmentation signal Sgci may be terminated without correcting the line segmentation signal Sgci if the edge Egi is not detected in the edge region EA (Step S150).

Step S110 to Step S160 exemplarily explain a process for correcting the line segmentation signal Sgci using the line image signal Li. For example, when the input image signal RGB and the segmentation signal Sgc respectively include n number of lines, the correction processor 220 may perform from Step S110 to Step S160 for each of a first line segmentation signal Sgc1 to an n-th line segmentation signal Sgci.

FIG. 10C is a diagram showing the corrected segmentation signal Scc output from the correction processor 220 after the correction for the line segmentation signal Sgci is completed as an image.

Referring to FIG. 3, FIG. 10B and FIG. 10C, when the corrected segmentation signal Scc outputted from the correction processor 220 is displayed as an image IM43 after the correction processing is completed to the line segmentation signal Sgci of the segmentation signal Sgc by the correction processor 220, noise at the boundary of a background and a character is reduced to a line Scci of the image IM43.

Figure 12:
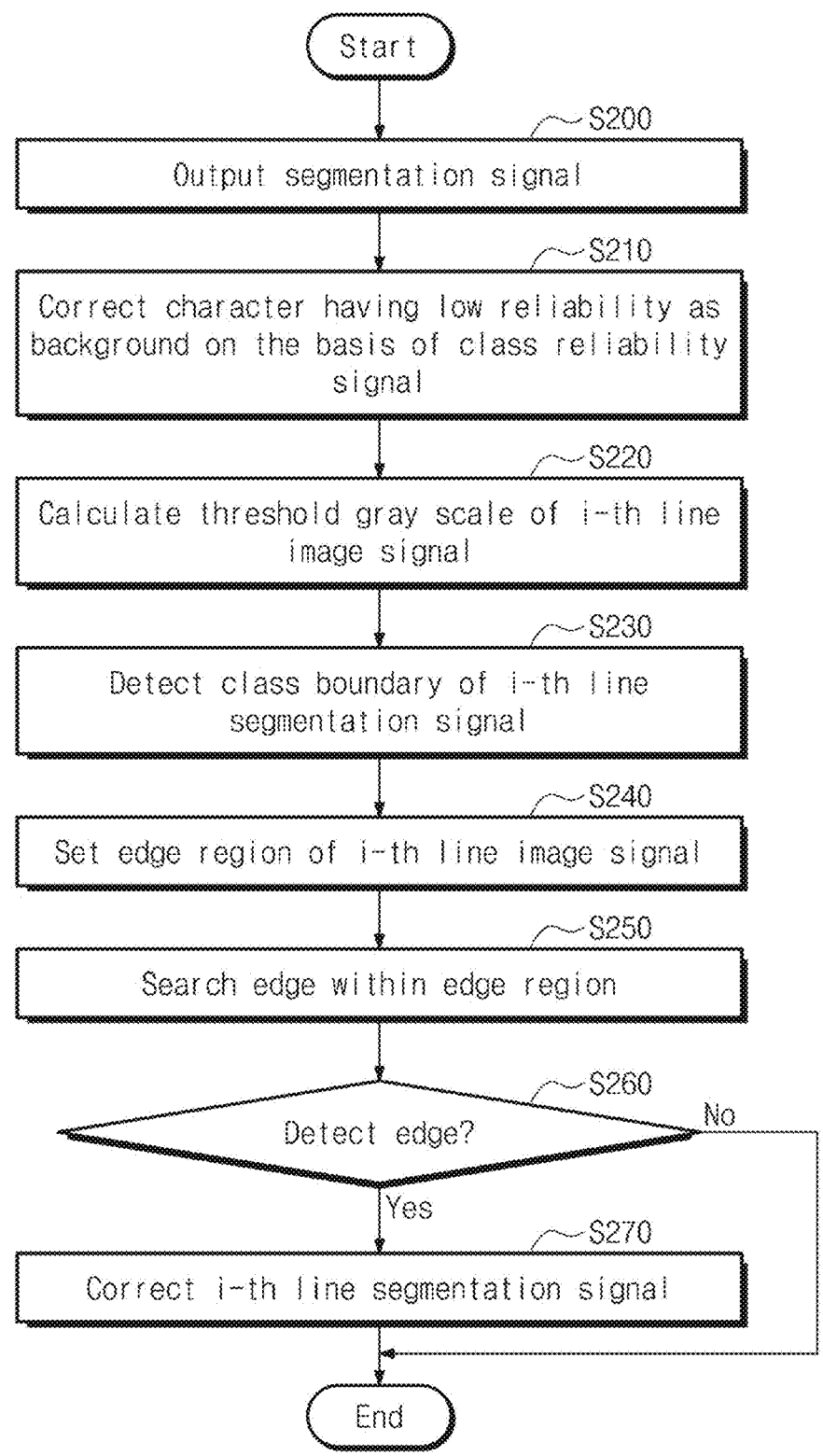
FIG. 12 is a diagram showing an example of the operation of an image processor according to another embodiment of the present disclosure.

FIG. 12 is a diagram showing an example of the operation of an image processor according to another embodiment of the present disclosure.

Referring to FIG. 3 and FIG. 12, the segmentation processor 210 classifies a class of the line image signal Li and outputs the segmentation signal Sgc representing the class and a class reliability signal Sgx representing the reliability of the class (Step S200).

Figure 13A:
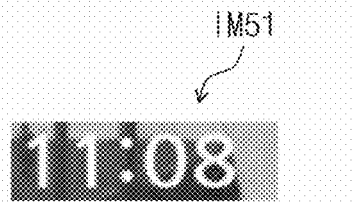
FIG. 13A to FIG. 13D are exemplary images for explaining the operation of an image processor.

The segmentation processor 210 outputs the segmentation signal Sgc in which a background of the line image signal Li illustrated in FIG. 13A is converted to a black grayscale and a character of the line image signal Li is converted to a gray grayscale. The class reliability signal Sgx represents the reliability of the segmentation signal Sgc classified as a character.

The correction processor 220 corrects a character (gray grayscale) with low reliability of the segmentation signal Sgc as a background (black grayscale) based on the class reliability signal Sgx (Step S210).

The correction processor 220 calculates the threshold grayscale THi of the i-th (i is a natural number) line image signal Li included in the line image signal Li (Step S220). The threshold grayscale THi is a signal in which the line image signal Li is smoothed.

The correction processor 220 detects the class boundary Egs of the line segmentation signal Sgci corresponding to the line image signal Li of the segmentation signal Sgc (S230). The class boundary Egs may refer to an edge of the line segmentation signal Sgci.

The correction processor 220 sets an edge region EA of the line image signal Li corresponding to the class boundary Egs (Step S240). The edge region EA may be set to include ±K number of pixel image signals (K is a natural number) based on the class boundary Egs. The correction processor 220 may set a number of pixel image signals as the edge region EA based on the class boundary Egs. For example, correction processor 220 may set ±20 number of pixel image signals.

The correction processor 220 compares the line image signal Li and the threshold gray level THi in the edge region EA and searches the edge Egi (Step S250).

When the edge Egi is detected in the edge region EA (Step S260), the correction processor 220 changes the class boundary Egs of the line segmentation signal Sgci to a corrected class boundary Egsc of a position corresponding to the edge Egi of the line image signal Li. In other words, the correction processor 220 performs a correction for changing the line segmentation signal Sgci between the class boundary Egs and the corrected class boundary Egsc to the first class (black grayscale (0)) representing a background (Step S270).

If the edge Egi is not detected in the edge region EA (Step S260), a correction operation for the line segmentation signal Sgci is terminated without correcting the line segmentation signal Sgci.

Step S220 to Step S270 exemplarily explain a process for correcting the line segmentation signal Sgci using the line image signal Li. For example, when the line image signal Li and the segmentation signal Sgc respectively include n number of lines, the correction processor 220 may perform from Step S220 to Step S270 for each of the first line segmentation signal Sgc1 to the n-th line segmentation signal Sgci.

Accordingly, a method of image processing may include performing semantic segmentation on an image signal to produce an image segmentation signal; performing edge detection on the image signal; correcting the image segmentation signal based on the edge detection to produce a corrected image segmentation signal; and displaying an image based on the corrected image segmentation signal.

In some cases, the method further comprises performing spatial filtering on the image signal, wherein the semantic segmentation is based on the spatial filtering. In some cases, the method further comprises calculating a threshold gray scale for the image signal; detecting a class boundary based on the image segmentation signal; and setting an edge region based on the class boundary, wherein the edge detection is detected within the edge region. In some cases, the method further comprises identifying a class reliability value based on the semantic segmentation, wherein the image segmentation signal is corrected based on the class reliability value.

FIG. 13A to FIG. 13D are exemplary images for explaining the operation of an image processor.

Referring to FIG. 3 and FIG. 13A, the segmentation processor 210 may receive the line image signal Li corresponding to an image IM51. The segmentation processor 210 outputs the segmentation signal Sgc in which a background of the line image signal Li illustrated in FIG. 13A is converted to a black grayscale and a character of the line image signal Li is converted to a gray grayscale.

Figure 13B:
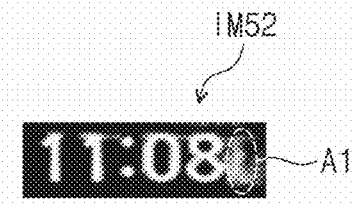

An image IM52 illustrated in FIG. 13B is an image of the segmentation signal Sgc output from the segmentation processor 210. As shown in FIG. 13B, a region A1 of the image IM52 should have been determined as a background, but instead, was identified as a character. Therefore, the region A1 of the image IM52 was represented in a grayscale.

If the correction processor 220 corrects the image IM52 illustrated in FIG. 13B without correcting the segmentation signal Sgc based on the class reliability signal Sgx, the region A1 of the image IM52 is corrected in the state of being recognized as a character.

Figure 13C:
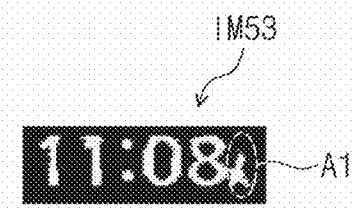
Figure 13D:
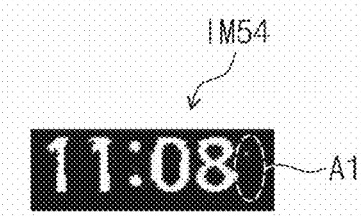

FIG. 13C shows the corrected segmentation signal Scc output from the correction processor 220 as an image IM52 when the correction processor 220 does not correct the segmentation signal Sgc based on the class reliability signal Sgx.

As shown in FIG. 13C, the image IM53 of the corrected segmentation signal Scc was a character for the region A1 and corrected, so noise can be seen as included as the noise is in the image IM53.

The correction processor 220, according to an embodiment of the present disclosure, corrects a character (gray grayscale) with low reliability of the segmentation signal Sgc as a background (black grayscale) based on the class reliability signal Sgx, and then outputs the corrected segmentation signal Scc. Therefore, seen in image IM54 for the corrected segmentation signal Scc output from the correction processor 220 illustrated in FIG. 13D, some or all of the region A1 may be corrected as a background.

Thus, a display device with the above configuration may increase the display quality of an image by correcting an edge of a segmentation processing result for a line image signal. Also, the display quality of the image may be increased by correcting to reflect a class reliability of the segmentation processing result.

In some embodiments, edge error may be further reduced in a region with low reliability by performing a pre-processing operation for performing spatial filtering on an input image signal. Filtering is a technique for modifying or enhancing an image. Spatial filtering refers to filtering where the processed value for a current pixel depends on both itself and surrounding pixels. Hence spatial filtering may be a neighborhood operation, in which the value of any given pixel in the output image is determined by applying an algorithm to the values of the pixels in the neighborhood of the corresponding input pixel. A pixel's neighborhood is a set of pixels determined based on proximity to the pixel itself.

Although embodiments of the present disclosure has been described, it will be understood by those skilled in the art that various modifications and changes in form and details may be made therein without departing from the spirit and scope of the inventive concept as set forth in the following claims. Additionally or alternatively, the embodiments disclosed in the inventive concept are not intended to limit the technical spirit of the inventive concept, and all technical concepts falling within the scope of the following claims and equivalents thereof are to be construed as being included in the scope of the present disclosure.

What is claimed is:

1. An image processor comprising:
   a pre-processor configured to perform spatial filtering on an input image signal and output a line image signal corresponding to a single scan line;
   a segmentation processor configured to classify a class of the line image signal and output a segmentation signal representing the class, wherein the segmentation signal comprises a single valued function with a one-dimensional domain corresponding to horizontal positions of the line image signal; and
   a correction processor configured to correct the segmentation signal based on the line image signal, wherein the correction processor detects a class boundary of the segmentation signal, wherein the class boundary indicates a first point among the horizontal positions of the line image signal, detects an edge within an edge region of the input image signal, wherein the edge comprises a second point among the horizontal positions of the line image signal, and corrects the segmentation signal based on the detected edge.

2. The image processor of claim 1, wherein the segmentation signal represents a first class when the line image signal represents a background and a second class when the line image signal represents a character.

3. The image processor of claim 2, wherein the first class corresponds to a first grayscale and the second class corresponds to a second grayscale different from the first grayscale, and the class boundary is a position adjacent to the first class and the second class of the segmentation signal.

4. The image processor of claim 2, wherein the line image signal comprises a plurality of pixel image signals.

5. The image processor of claim 4, wherein the correction processor is configured to calculate a threshold grayscale of the line image signal, and to detect, as the edge of the line image signal, a position of a pixel image signal which is adjacent to a pixel image signal of a different grayscale from the threshold grayscale among the pixel image signals within the edge region of the line image signal corresponding to the class boundary and which has the same grayscale as the threshold grayscale.

6. The image processor of claim 5, wherein the correction processor does not correct the segmentation signal when the edge is not detected in the edge region of the line image signal corresponding to the class boundary.

7. The image processor of claim 5, wherein the edge region of the line image signal corresponding to the class boundary comprises ±K number of pixel image signals (where K is a natural number) based on the class boundary, and the correction processor is configured to output a corrected segmentation signal with the class boundary corrected based on the edge of the line image signal.

8. The image processor of claim 2, wherein the segmentation processor is further configured to output a class reliability signal representing a reliability of the first class and the second class, and the correction processor changes the segmentation signal of the second class which has low reliability to the segmentation signal of the first class in response to the class reliability signal.

9. A display device comprising:
   a display panel including a plurality of pixels connected to a plurality of data lines and a plurality of scan lines, respectively;
   a data driving circuit configured to drive the plurality of data lines;
   a scan driving circuit configured to drive the plurality of scan lines; and
   a driving controller configured to receive a control signal and an image signal and to control the data driving circuit and the scan driving circuit such that an image is displayed on the display panel, wherein the driving controller includes:
   a pre-processor configured to perform spatial filtering on an input image signal and output a line image signal corresponding to a single scan line;
   a segmentation processor configured to classify a class of the line image signal and output a segmentation signal representing the class, wherein the segmentation signal comprises a single valued function with a one-dimensional domain corresponding to horizontal positions of the line image signal;
   a correction processor configured to output a corrected segmentation signal corrected for the segmentation signal based on the line image signal; and
   a data signal output part configured to receive the line image signal and the corrected segmentation signal and provide a data signal to the data driving circuit, wherein the correction processor detects a class boundary of the segmentation signal, wherein the class boundary indicates a first point among the horizontal positions of the line image signal, detects an edge within an edge region of the line image signal, wherein the edge comprises a second point among the horizontal positions of the line image signal, and corrects the segmentation signal based on the detected edge.

10. The display device of claim 9, wherein the segmentation signal represents a first class when the line image signal represents a background and a second class when the line image signal represents a character.

11. The display device of claim 10, wherein the first class corresponds to a first grayscale and the second class corresponds to a second grayscale different from the first grayscale, and the class boundary represents a position adjacent to the first class and the second class of the segmentation signal.

12. The display device of claim 10, wherein the line image signal includes a plurality of pixel image signals, and the correction processor is configured to calculate a threshold grayscale of an i-th line image signal (where i is a natural number), and to detect, as the edge of the line image signal, a position of a pixel image signal which is adjacent to a pixel image signal of a different grayscale from the threshold grayscale among the pixel image signals within the edge region of the line image signal corresponding to the class boundary and which has the same grayscale as the threshold grayscale.

13. The display device of claim 10, wherein the segmentation processor is further configured to output a class reliability signal representing a reliability of the first class and the second class, and the correction processor is configured to change the segmentation signal of the second class, which has low reliability, to the segmentation signal of the first class in response to the class reliability signal.

14. An operation method of a display device, the method comprising:
performing spatial filtering on an input image signal to output a line image signal corresponding to a single scan line;
classifying a class of the line image signal to output a segmentation signal representing the class, wherein the segmentation signal comprises a single valued function with a one-dimensional domain corresponding to horizontal positions of the line image signal;
detecting a class boundary of the segmentation signal, wherein the class boundary indicates a first point among the horizontal positions of the line image signal;
computing an edge region of the line image signal, wherein the edge region comprises a range of the horizontal positions of the line image signal including the first point;
detecting an edge within the edge region of the line image signal, wherein the edge comprises a second point among the horizontal positions of the line image signal; and
correcting the segmentation signal based on the detected edge.

15. The method of claim 14, wherein the segmentation signal represents a first class when the line image signal represents a background and a second class when the line image signal represents a character, and the class boundary of the segmentation signal is a position adjacent to the first class and the second class.

16. The method of claim 15, wherein the line image signal comprises a plurality of individual line image signals respectively corresponding to lines, and each of the individual line image signals includes a plurality pixel image signals, and the detecting of an edge comprises calculating a threshold grayscale of the line image signal, and detecting, as the edge of the line image signal, a position of a pixel image signal which is adjacent to a pixel image signal of a different grayscale from the threshold grayscale among the pixel image signals within the edge region of the line image signal corresponding to the class boundary and which has the same grayscale as the threshold grayscale.

17. The method of claim 16, further comprising:
refraining from correcting the segmentation signal when the edge is not detected in the edge region of the line image signal corresponding to the class boundary.

18. The method of claim 16, wherein the edge region of the line image signal corresponding to the class boundary comprises ±K number of pixel image signals (K is a natural number) based on the class boundary.

19. The method of claim 15, wherein the outputting of a segmentation signal comprises further outputting a class reliability signal representing a reliability of the first class and the second class.

20. The method of claim 19, further comprising:
outputting a corrected segmentation signal in which the segmentation signal of the second class, which has low reliability, is changed to the segmentation signal of the first class in response to the class reliability signal, wherein the detecting of a class boundary of the segmentation signal includes detecting the class boundary of the corrected segmentation signal.

\* \* \* \* \*